United States Patent [19]
Gidney et al.

[11] Patent Number: 5,697,398
[45] Date of Patent: Dec. 16, 1997

[54] FLUID PRESSURE REGULATOR WITH BOOST TUBE UNIT INCLUDING STEM GUIDE AND LEVER RETAINER

[75] Inventors: Larry Dean Gidney, McKinney; Gregory Lawrence Foust, Richardson, both of Tex.

[73] Assignee: Fisher Controls International, Inc., Clayton, Mo.

[21] Appl. No.: 673,333

[22] Filed: Jun. 28, 1996

Related U.S. Application Data

[62] Division of Ser. No. 512,450, Aug. 8, 1995.
[51] Int. Cl.$^6$ .................................................. G05D 16/02
[52] U.S. Cl. .................................. 137/484.8; 137/505.47
[58] Field of Search ........................ 137/484.8, 484.6, 137/505.46, 505.47

[56] References Cited

U.S. PATENT DOCUMENTS

| | | | |
|---|---|---|---|
| 2,099,244 | 11/1937 | Temple et al. | 74/470 |
| 2,619,983 | 12/1952 | Roberts | 137/505 |
| 2,669,071 | 2/1954 | St. Clair | 137/505.46 |
| 2,729,236 | 1/1956 | Yalince | 137/505.46 |
| 3,599,658 | 8/1971 | Kruzan | 137/116.5 |
| 3,623,506 | 11/1971 | Bonner | 137/613 |
| 3,982,559 | 9/1976 | Ochs | 251/368 |
| 4,069,839 | 1/1978 | Hughes | 137/505.46 |
| 4,195,656 | 4/1980 | Kanerva et al. | 137/458 |
| 4,491,149 | 1/1985 | Trinkwalder | 137/505.46 |
| 4,503,883 | 3/1985 | Meacham, Jr. | 137/458 |
| 4,619,436 | 10/1986 | Bonzer et al. | 251/61.1 |
| 4,720,079 | 1/1988 | Iizuka et al. | 251/368 |
| 4,754,778 | 7/1988 | Duffy et al. | 137/484.8 |
| 4,972,868 | 11/1990 | Davis et al. | 137/116.5 |
| 5,009,245 | 4/1991 | Esola et al. | 137/505.47 X |
| 5,402,820 | 4/1995 | Duffy et al. | 137/505.36 |

FOREIGN PATENT DOCUMENTS

| | | |
|---|---|---|
| 745487 | of 1970 | Belgium . |
| 1062075 | 1/1958 | Germany . |
| 335450 | 9/1930 | United Kingdom . |

OTHER PUBLICATIONS

"1813C Regulator," *American Meter Company*, 3 pp. (Mar. 1981).
Fisher Controls Accu–Pressure Brochure, "Gas Blanketing and Vapor Recovery. Savings and Safety" *Fisher Controls International, Inc.*, Form 7810, pp. 1–16 (Nov. 1991).
Fisher Controls Brochure, Type S251–S254 Instruction Manual, *Fisher Controls*, Form 5136, pp. 1–6 (Jun. 1980) with Attachment A, 1 p. (1989).
Fisher® Instruction Manual Type S100 and S102 Gas Regulators, Fisher Controls, Form 1250, pp. 1–6, (Mar. 1983).
Fisher® S200 Series Pressure Regulators, Fisher Controls International, Inc. P.O., Bulletin 71.1:S200 pp. 1–16 (Jul. 1986).
Fisher® 627 Series Self–Operated Pressure Reducing Regulators, Fisher Controls International, Inc. Bulletin 71.1:627 pp.1–24 (May 1990).
Jordan Valve Brochure, "Mark 608 Gas Pressure Regulator," Bulletin MK608, 8 pp. (May 1988).
Jury, "Fundamentals of Gas Pressure Regulation," Fisher® Technical Monograph 27, Fisher Controls, pp. 1–12, (1972).

*Primary Examiner*—Stephen M. Hepperle
*Attorney, Agent, or Firm*—Marshall, O'Toole, Gerstein, Murray & Borun

[57] ABSTRACT

A method of manufacturing a diaphragm assembly for a fluid pressure regulator includes the steps of providing a diaphragm head unit having a first side and a spring seat, providing a fabric layer, providing an elastomer layer, applying an adhesive to the first side of the diaphragm head unit, placing the fabric layer between the elastomer layer and the first side of the diaphragm heat unit to form a sandwich, and applying heat and pressure to the sandwich. In a fluid pressure regulator including a disk for regulating the flow of fluid through an orifice, a valve stem attached to the disk, a valve stem guide surrounding a portion of the stem, a valve lever coupled to the valve stem, a pivot pin pivotally connecting the valve lever to a lower casing, a lever retainer adjacent the pivot pin for holding the pivot pin in place, and a boost tube adjacent the orifice, the boost tube, stem guide, and lever retainer comprise a one-piece boost tube unit.

7 Claims, 2 Drawing Sheets

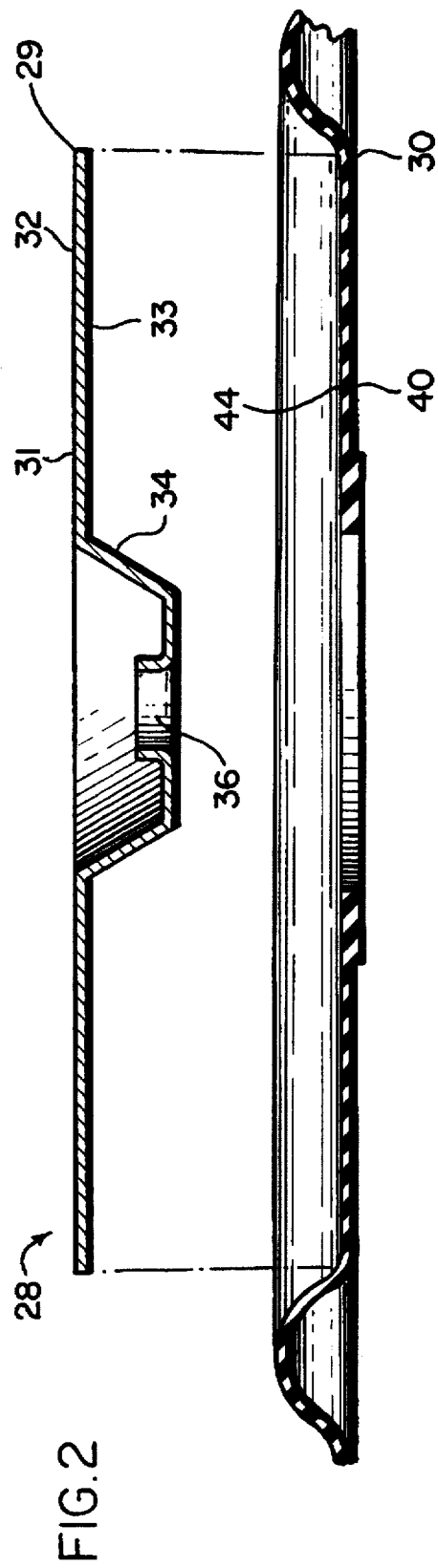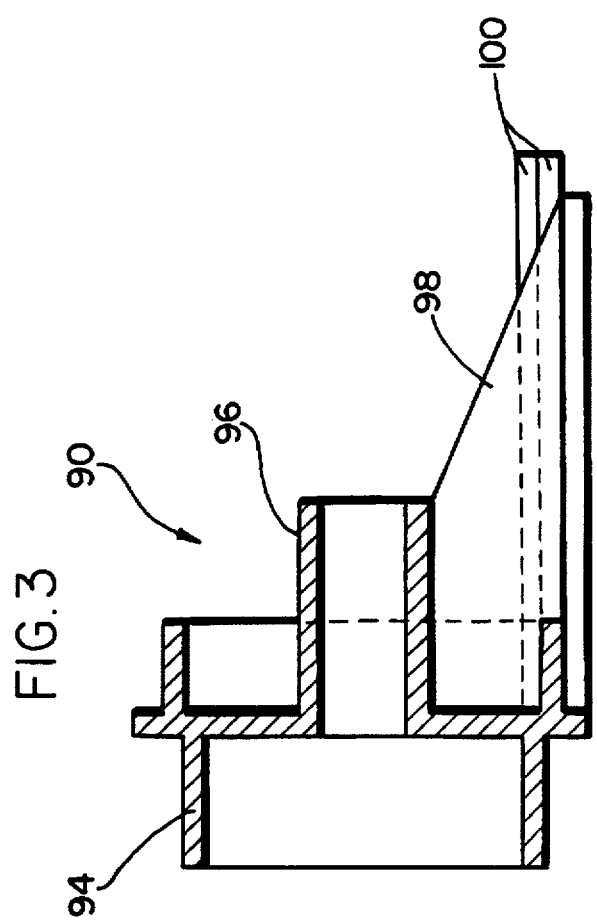

5,697,398

FLUID PRESSURE REGULATOR WITH BOOST TUBE UNIT INCLUDING STEM GUIDE AND LEVER RETAINER

This is a Divisional of U.S. application Ser. No. 08/512,450, filed Aug. 8, 1995 pending.

This invention relates to fluid pressure regulators and in particular to methods and apparatus for manufacturing such regulators.

BACKGROUND OF THE INVENTION

Fluid regulators, such as gas pressure regulators, are in common use in gas pipeline systems to assist in maintaining system pressure within acceptable limits. In a gas pressure regulator, for example, the primary function of the regulator is to match the flow of gas through the regulator to the demand for gas placed upon the system. Also, the pressure regulator must maintain the system pressure within acceptable limits. In one type of such gas pressure regulator, a diaphragm assembly is set to a predetermined set point by an adjustable control spring. A pivoting lever is connected to the diaphragm assembly and responds to diaphragm pressure to throttle a disk with respect to an orifice, where the orifice communicates the inlet pressure to the regulator outlet.

The disk and orifice may be referred to as portions of a restricting element which are placed into the gas flow stream and provide a variable restriction that can modulate the flow of gas through the regulator in accordance with the sensed downstream pressure. The diaphragm assembly may also be called a loading element which can provide a loading force to the restricting element. Thus, a loading pressure is applied to the diaphragm in response to the sensed downstream pressure to produce a loading force that will act to close the restricting element. The diaphragm spring provides a reverse loading force which acts to open the restricting element.

Accordingly, if the load flow in the pipeline system decreases, then the regulator flow also must decrease in order to avoid having the regulator place too much gas into the system which would tend to increase the downstream pipeline pressure. On the other hand, if the load flow increases, then the regulator flow also must increase in order to keep the pipeline pressure at the regulator output from decreasing due to a shortage of gas in the pipeline system.

One problem with prior fluid regulators having diaphragm assemblies relates to the manufacturing process for the diaphragm assembly. The diaphragm assembly generally includes a diaphragm plate, a spring seat for mounting the control spring, and a diaphragm comprised of an elastomer layer and a fabric layer. To manufacture a diaphragm assembly the spring seat is inserted in the diaphragm plate, the elastomer and fabric layers are combined in a calendering process, cured in an oven, and cut to size to form a diaphragm, and the diaphragm is attached to the diaphragm plate by an adhesive. It is desired to simplify and reduce the cost of the manufacturing process by combining the diaphragm plate and spring seat into a single part, and by attaching the diaphragm plate, elastomer layer, and fabric layer together in a single molding step.

Another problem with prior regulators relates to connecting the pivoting lever to the regulator housing and to the disk. The lever pivots about a pivot pin, which is held in place in the housing by screws. An end of the lever is connected to a valve stem by a rivet or screw, and the valve stem is attached to the disk, which throttles the orifice. It is further desired to simplify and reduce the cost of the mounting arrangement for the pivoting lever by eliminating the need for screws and rivets to mount the lever.

SUMMARY OF THE INVENTION

A method of manufacturing a diaphragm assembly for a fluid pressure regulator includes the steps of providing a diaphragm head unit having a first side and a spring seat, providing a fabric layer, providing an elastomer layer, applying an adhesive to the first side of the diaphragm head unit, placing the fabric layer between the elastomer layer and the first side of the diaphragm heat unit to form a sandwich, and applying heat and pressure to the sandwich.

In a fluid pressure regulator including a disk for regulating the flow of fluid through an orifice, a valve stem attached to the disk, a valve stem guide surrounding a portion of the stem, a valve lever coupled to the valve stem, a pivot pin pivotally connecting the valve lever to a lower casing, a lever retainer adjacent the pivot pin for holding the pivot pin in place, and a boost tube adjacent the orifice, the boost tube, stem guide, and lever retainer comprise a one-piece boost tube unit.

BRIEF DESCRIPTION OF THE DRAWINGS

FIG. 2 is an exploded sectional view of a molded diaphragm assembly.

FIG. 3 is a sectional view of a boost tube unit.

DETAILED DESCRIPTION

Figure 1:
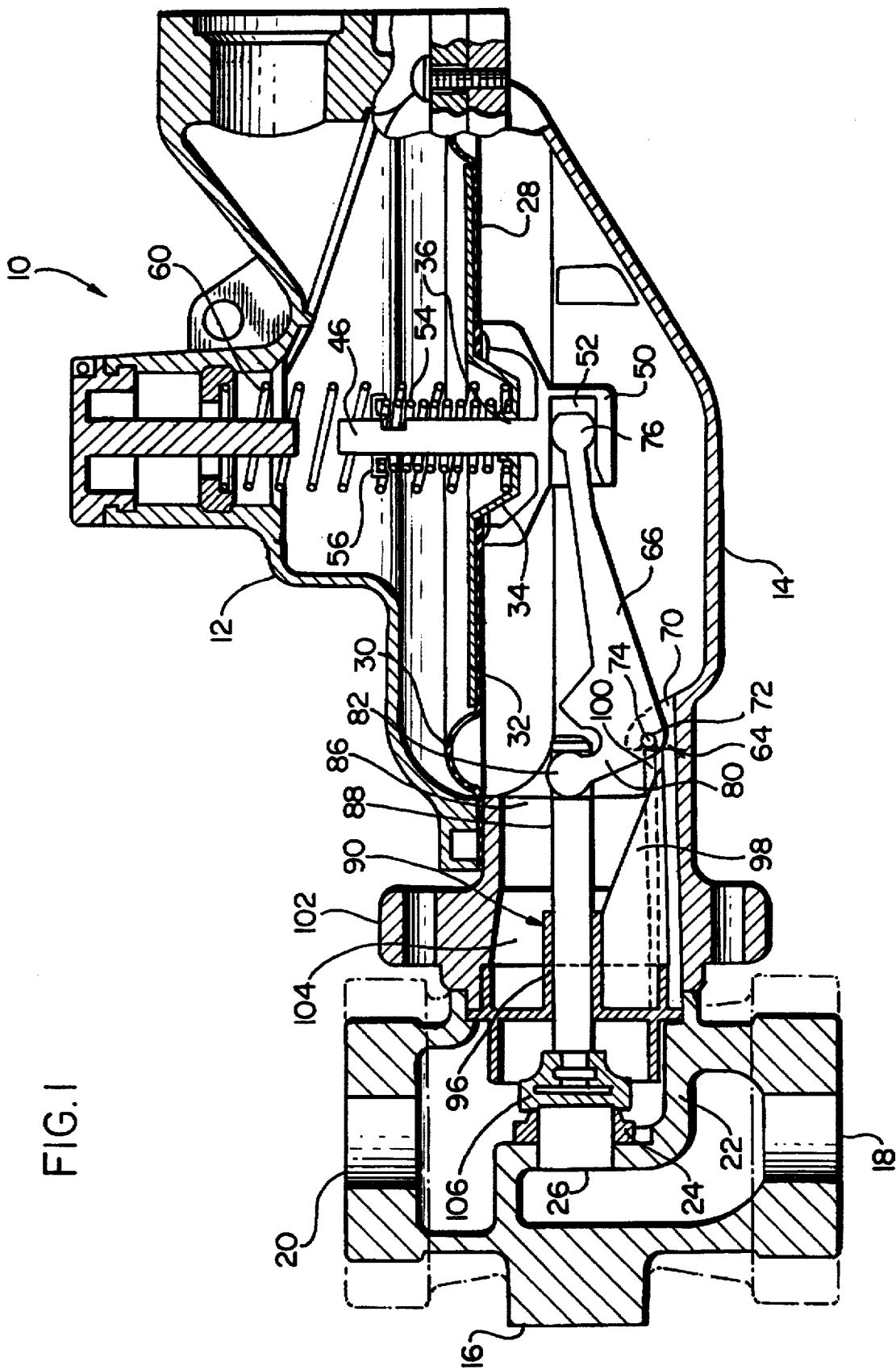
FIG. 1 is a partly fragmented sectional elevational view of a fluid pressure regulator including a molded diaphragm assembly and boost tube unit in accordance with the principles of the present invention.

FIGS. 1-3 illustrate a preferred embodiment of a fluid pressure regulator, such as a gas pressure regulator in accordance with the invention. The illustrated gas pressure regulator includes an improved molded diaphragm assembly and a single piece boost tube unit that includes a stem guide and a lever retainer. It is to be understood that a liquid pressure regulator also may be provided in accordance with the principles of the invention, as the illustrated gas pressure regulator is one example of a fluid pressure regulator according to the invention.

FIG. 1 illustrates a gas pressure regulator 10 which includes a spring case 12, a diaphragm case or lower regulator case 14, and a body 16. Within body 16, there is provided an inlet 18 for connection to a fluid pressure, such as a gas pressure source, and there is also provided an outlet 20 for connection to a downstream pipeline. Body wall 22 includes an orifice unit 24 containing an orifice 26 which communicates the inlet 18 to the outlet 20.

A loading element in the form of a diaphragm assembly 28 mounted within the regulator includes a diaphragm 30 mounted at its perimeter between the diaphragm case 14 and the spring case 12, and a diaphragm head unit 32, which includes a spring seat 34. A relief spring rod 46, which is attached to a pusher post 50, is inserted through an aperture 36 at the center of the diaphragm assembly 28. The relief spring rod 46 fits inside of relief spring 54, which is held in place by spring retainer 56. A diaphragm spring 60 applies a sufficient loading force downwardly on the diaphragm assembly 28 at the spring seat 34 so as to provide a pressure set point for the regulator 10 as will be described more particularly hereinafter.

A lever assembly 64 includes a pivoting lever 66 pivotally connected to a bracket 70 at pivot point 72 by a pin 74. The pin 74 is held in place by a pair of fingers 100 of a lever retainer 98, which is part of a boost tube unit 90, described in more detail below. Lever end 76 is drivingly engaged with the pocket 52 of pusher post 50. Another lever end 80 includes a hook 82 engaging a groove 86 in a sliding stem 88. Diaphragm casing 14 includes a hollow stub 102 with an interior throat 104. Within stub 102 is a stem guide 96, which is a part of boost tube unit 90. The stem guide 96 is a hollow cylindrical member adapted to accommodate the sliding stem 88.

Throat 104 communicates diaphragm casing 14 with the downstream pressure at outlet 20 as shown in FIG. 1. A restricting element such as a disk 106 is mounted on one end of stem 88 for engaging the orifice unit 24 in restricting the passage of fluid in orifice 26 between inlet 18 and outlet 20 of body 16 in response to the regulator loading element, i.e. diaphragm assembly 28. As can be seen in FIG. 1, pivoting of the lever 66 in a counterclockwise direction around pivot point 72 moves the valve stem 88 towards the left in FIG. 1, thus forcing the disk 106 towards the orifice unit 24. On the other hand, clockwise pivotal movement of lever 66 about pivot point 72 pulls valve stem 88 towards the right in FIG. 1 and moves disk 106 away from the orifice unit 24. Regulator 10 includes conventional relief means permitting internal pressure relief between the lower and upper casings.

In the initial setup of regulator 10, an adjusting screw coupled to diaphragm spring 60 is adjusted to adjust the spring compression on diaphragm 30 while the downstream pressure at outlet 20 is monitored with a pressure gauge during the adjustment procedure. Adjusting the spring compression so as to compress diaphragm spring 60 tends to urge the diaphragm assembly 28 downwardly in FIG. 1, thereby pivoting the lever 66 in a clockwise direction about pivot point 72, which lifts the disk 106 off of or away from the orifice 26. This opens the orifice or increases the opening and allows the communication of process fluid between the inlet 18 and the outlet 20 via the orifice 26.

When the pipeline load flow decreases, this causes an increase in the downstream pressure at outlet 20, which pressure is coupled through throat 104 into diaphragm casing 14. Regulator 10 must regulate the flow of fluid through body 16 so as to prevent too much gas from being placed into the system. Thus, as the pressure increases in diaphragm casing 14 beyond the regulator set point, this forces the diaphragm 30 upwardly in FIG. 1, which pivots lever 66 counterclockwise about pivot point 72 so as to move disk 106 towards orifice 26, which restricts the passage of gas through orifice 26. Thus, once the regulator set point is reached, the regulator must match the flow of gas through the regulator to the demand for gas placed upon the system.

In connection with the regulator of FIG. 1, this means that the fluid flow area through orifice 26 is proportionally increased or reduced in relation to downstream demand until a position of equilibrium is reached and the regulator maintains a steady-state position about the regulator set point. It is therefore desired that the regulator provide a stable flow of fluid or gas through body 16 so as to match the amount required by the system.

The improved diaphragm assembly 28, shown in FIGS. 1 and 2, includes a diaphragm head unit 32, which includes side 31, another side 33, and a spring seat 34. The diaphragm head unit 32 is preferably formed of a single piece of metal, such as aluminum. The diaphragm assembly also includes a diaphragm 30, which has an elastomer layer 40 and a fabric layer 44. In a preferred embodiment the elastomer layer 40 comprises a nitrile elastomer and the fabric layer 44 comprises a polyester fabric.

In the manufacturing process for the diaphragm assembly, the elastomer layer is milled on a two-roll mill and extruded on a Barwell extruder. Adhesive, such as a water-based adhesive known as Chemlok #8026, manufactured by Lord Chemical Co., is applied to side 33 of the diaphragm head unit 32. For molding, the fabric layer 44 is then placed adjacent side 33 and the elastomer layer 40 is placed adjacent fabric layer 44, so the fabric layer 44 is between the diaphragm head unit 32 and the elastomer layer 40, thus forming a sandwich 42. The sandwich 42 is then placed in a compression molding apparatus for molding the diaphragm assembly. Preferred molding conditions are believed to include a force of 90–120 tons (800–1068 kilonewtons), a temperature of 320°–340° F. (160°–171° C.), and a cure time of 4–6 minutes. During the molding process some of the elastomer layer 40 permeates the fabric layer 44. Preferably, some of the elastomer 40 that permeates the fabric layer 44 also covers a small amount, such as 0.125 inches (3.18 millimeters), of the outer edge 29 of side 31 of the diaphragm head unit 32.

As shown in FIGS. 1 and 3, the regulator 10 includes a one-piece boost tube unit 90, which includes a boost tube 94, a stem guide 96, and a lever retainer 98. The boost tube unit 90 is preferably a one-piece injection-molded plastic unit. The lever retainer 98 includes two fingers 100 which hold the pivot pin 74 and pivoting lever 66 in position, as shown in FIG. 1. By using the lever retainer 98, there is no need for screws to hold the pivot pin 74 in position. As already noted, the stem guide 96 is adapted to accommodate the sliding stem 88. The boost tube 94 is known in the art to improve the function of a regulator 10 by helping to minimize the "droop" effect, or decrease in downstream pressure of the pipeline as load flow increases.

The foregoing detailed description has been given for clearness of understanding only, and no unnecessary limitations should be understood therefrom, as modifications will be obvious to those skilled in the art.

We claim:

1. A one-piece boost tube unit for a fluid pressure regulator having a lever pivot pin disposed in a bracket having a groove on one side thereof, comprising:

a hollow cylindrical boost tube;

a hollow cylindrical valve stem guide integral with the boost tube and concentric with the boost tube; and a lever retainer integral with the boost tube having an end that contacts the lever pivot pin to hold the lever pivot pin in the groove of the bracket.

2. The boost tube unit of claim 1, wherein the boost tube unit comprises plastic.

3. The boost tube unit of claim 2, wherein the boost tube unit is injection molded.

4. In a fluid pressure regulator for regulating the pressure of a fluid, the regulator including a disk for regulating the flow of fluid through an orifice, a valve stem attached to the disk, a valve stem guide surrounding a portion of the stem, a valve lever coupled to the valve stem, a pivot pin pivotally connecting the valve lever to a bracket on a lower casing, and a boost tube adjacent the orifice, the improvement comprising:

a groove on an exterior edge of said bracket for accepting the pivot pin; and a lever retainer disposed adjacent the pivot pin for holding the pivot pin in the groove; wherein said boost tube, stem guide, and lever retainer comprise a one-piece boost tube unit.

5. The improvement of claim 1, wherein the boost tube unit comprises plastic.

6. The improvement of claim 1, wherein the boost tube unit is injection molded.

7. A fluid pressure regulator comprising:

a regulating member for regulating the flow of fluid through an orifice;

a valve stem attached to the regulating member;

a valve lever coupled to the valve stem and pivotally mounted on a pivot pin;

a bracket having a groove on an exterior edge thereof for accepting the pivot pin; and a single-piece boost tube having a valve stem guide that accepts the valve stem therethrough and a lever retainer having an end that contacts the pivot pin to hold the pivot pin within the groove in the bracket.

* * * * *